United States Patent
Hubert

(10) Patent No.: US 6,533,221 B1
(45) Date of Patent: Mar. 18, 2003

(54) DEVICE FOR SUPPORTING A PAYLOAD IN A LAUNCH VEHICLE OF SAID PAYLOAD

(75) Inventor: Pascal Hubert, Perignat les Sarlieve (FR)

(73) Assignee: Centre National d'Etudes Spatiales, Paris Cedex (FR)

( * ) Notice: Subject to any disclaimer, the term of this patent is extended or adjusted under 35 U.S.C. 154(b) by 0 days.

(21) Appl. No.: 09/868,642

(22) PCT Filed: Dec. 28, 1999

(86) PCT No.: PCT/FR99/03303

§ 371 (c)(1),
(2), (4) Date: Oct. 5, 2001

(87) PCT Pub. No.: WO00/38988

PCT Pub. Date: Jul. 6, 2000

(30) Foreign Application Priority Data

Dec. 29, 1998 (FR) .............................. 98 16562

(51) Int. Cl.$^7$ .............................. B64G 1/22; B64G 1/64
(52) U.S. Cl. ................... 244/158 R; 244/2; 244/54; 244/125; 244/127; 267/140.15; 267/219; 188/267; 188/268; 188/378; 188/379; 188/380; 248/550; 248/562; 248/566; 248/636; 248/604; 248/638
(58) Field of Search .................. 244/158 R, 118.1, 244/125, 127, 904, 2, 54; 267/140.15, 219; 188/267, 268, 378–380; 248/550, 562, 566, 636, 638, 604; 440/52

(56) References Cited

U.S. PATENT DOCUMENTS

| 3,351,307 | A |   | 11/1967 | Michel et al. ................. 248/18 |
| 4,755,154 | A |   | 7/1988 | Ewbank ....................... 440/52 |
| 5,178,357 | A | * | 1/1993 | Platus ........................ 248/619 |
| 5,390,892 | A | * | 2/1995 | Platus ........................ 248/619 |
| 5,878,980 | A | * | 3/1999 | Cooley, Jr. .................. 244/172 |
| 6,244,541 | B1 | * | 6/2001 | Hubert .................... 244/158 R |

FOREIGN PATENT DOCUMENTS

| EP | 0 727 351 | 8/1996 |
| WO | 98/32658 | 7/1998 |
| WO | 99/00299 | 1/1999 |

* cited by examiner

Primary Examiner—Charles T. Jordan
Assistant Examiner—Stephen A Holzen
(74) Attorney, Agent, or Firm—Jacobson Holman PLLC

(57) ABSTRACT

The invention concerns a launch vehicle comprising a shroud (1a, 5a) supporting auxiliary propellers (2, 3) applying in operation excess flow of stresses to the shroud (1a, 5a), said device comprising means for coupling the payload (4) with the launch vehicle shroud. The invention is characterized in that the coupling means are designed to ensure a mechanical coupling between the payload (4) and the shroud along the direction of the launch vehicle longitudinal axis (X), and to cause them to be disengaged along radial and tangential directions. The invention is useful for neutralizing the effects on the payload of excess stresses applied on the launch vehicle shroud by the auxiliary propellers (2, 3).

21 Claims, 2 Drawing Sheets

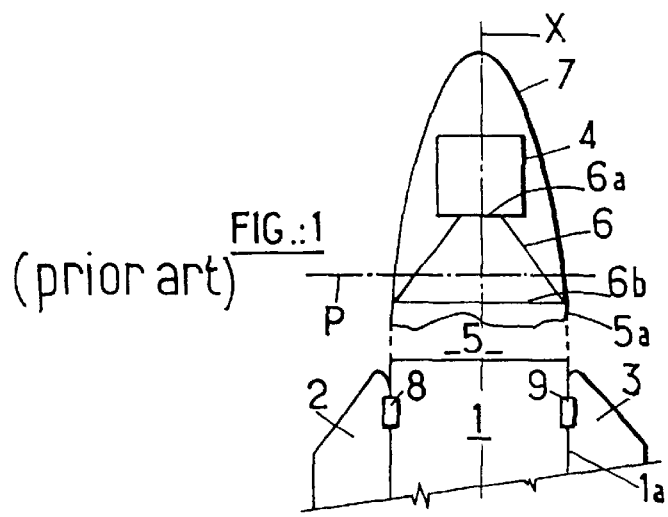
FIG.:1 (prior art)
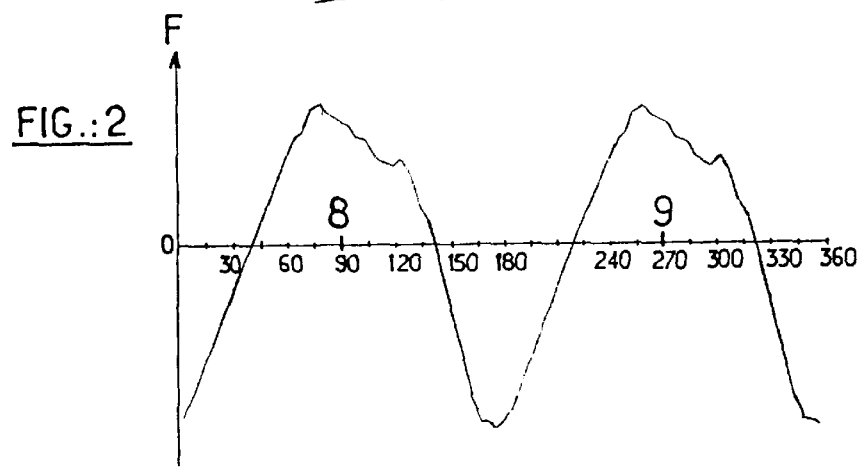
FIG.:2
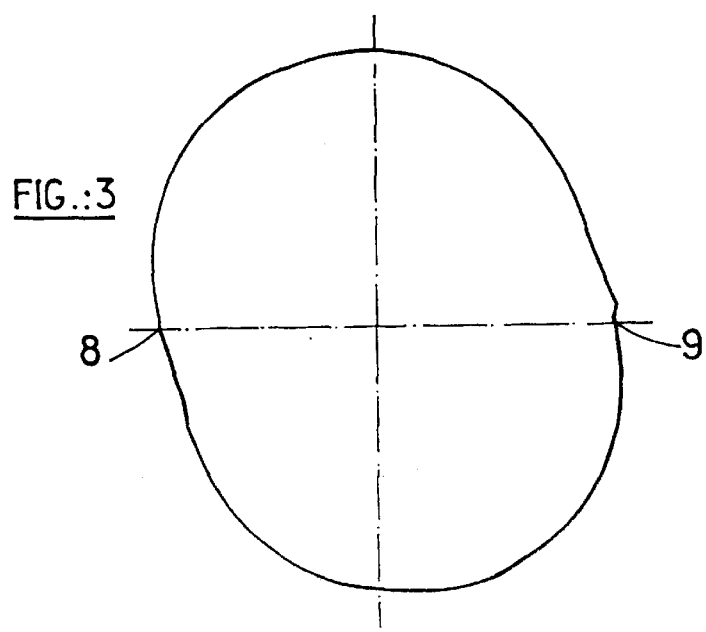
FIG.:3

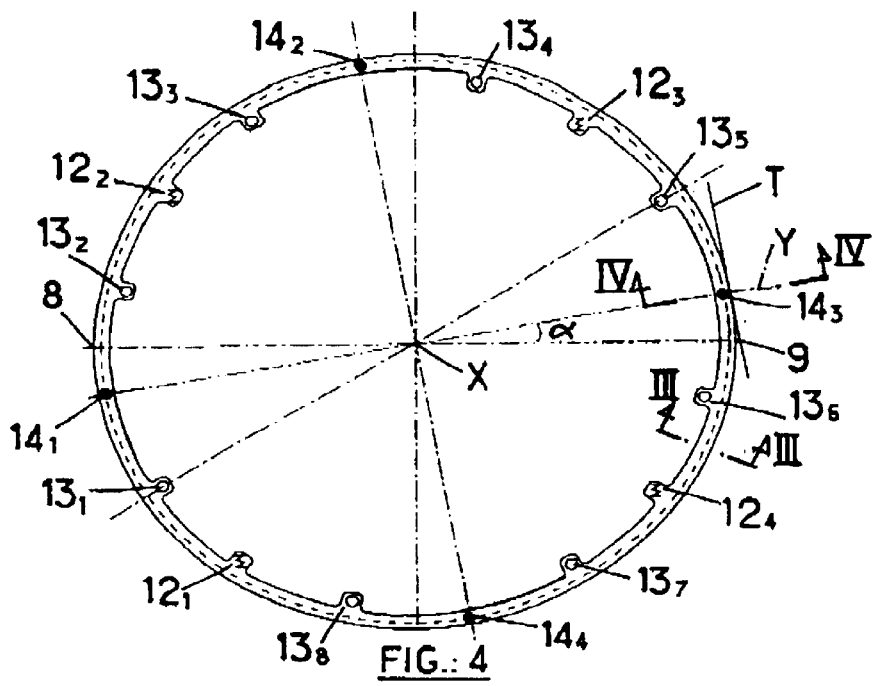
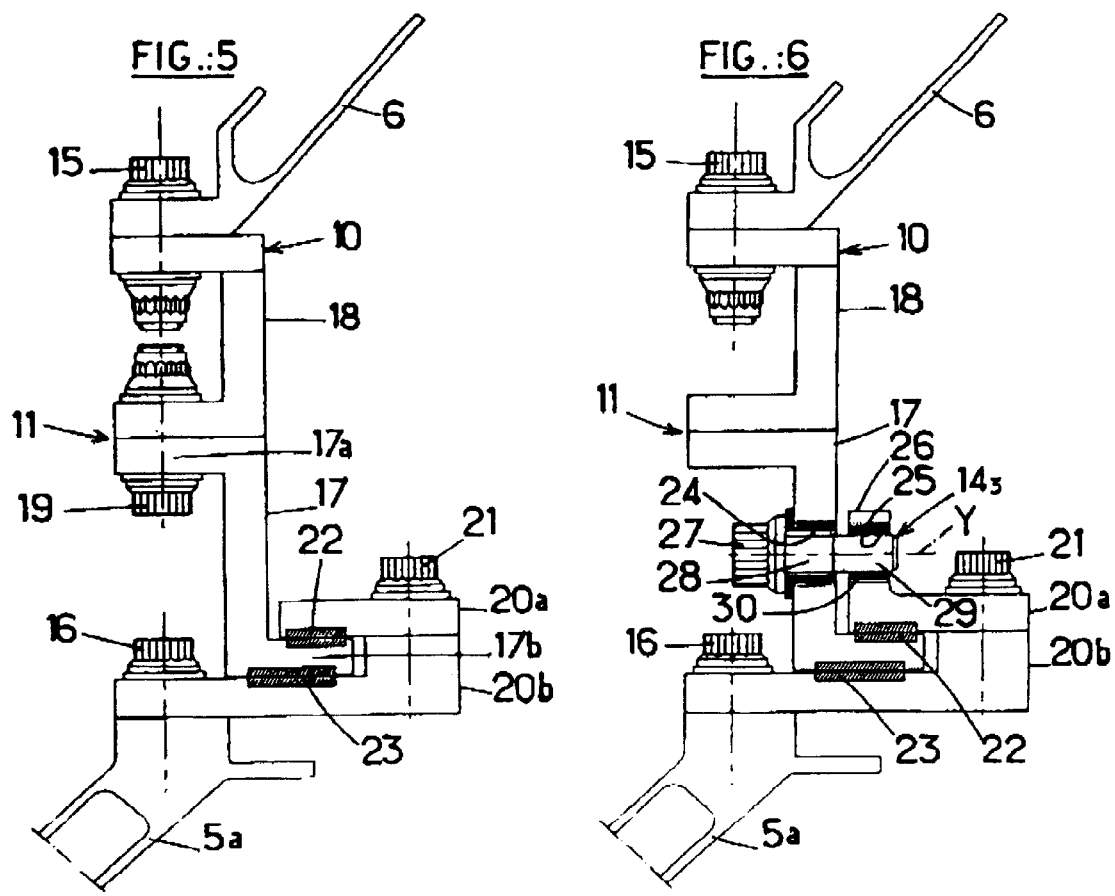

DEVICE FOR SUPPORTING A PAYLOAD IN A LAUNCH VEHICLE OF SAID PAYLOAD

BACKGROUND OF THE INVENTION

1. Field of the Invention

The present invention relates to a device for supporting a payload in a launch vehicle for launching said payload, said launch vehicle including a shell supporting at least one booster which in operation applies excess forces to said shell, said device including a system for mechanically connecting said payload to said shell of the launch vehicle.

2. Description of the Related Art

This kind of device is disclosed in applicant's international patent application WO 98/32658, corresponding to U.S. Pat. No. 6,244,541, with issue date of Jun. 12, 2001. It is designed to be integrated into a launch vehicle for launching a payload into space, shown diagrammatically in FIG. 1 of the accompanying drawings, in which the launch vehicle includes a first stage 1 equipped with boosters 2 and 3 fixed to the shell 1a of the first stage in diametrally opposite positions and parallel to the longitudinal axis X of the shell. FIG. 1 also shows diagrammatically a payload such as a satellite 4 mounted on the shell 5a of a second stage 5 of the launch vehicle by means of an adapter in the form of a frustoconical skirt 6. The satellite is conventionally protected by a nose-cap 7 while passing through the atmosphere. The shells 1a and 5a are cylindrical, co-extensive and fastened together.

As explained in the patent application previously cited, the thrust developed by the boosters 2, 3 applies high axial forces to the shell 1a of the first stage, in particular at the points 8, 9 at which the boosters 2, 3 are attached to the first stage. FIG. 2 of the accompanying drawings shows the intensity F of these forces as observed at the periphery of the shell 1a.

The forces are much more pronounced at the attachment points 8, 9 (at angular positions of 90° and 270°, respectively) and it they were transmitted to the skirt 6 via the shell 5a of the second stage 5 they would cause asymmetrical deformation of the skirt, which could damage the satellite if no countermeasures were applied. FIG. 3 of the accompanying drawings shows in cross section the "deformation" of the shell of the launch vehicle subjected to the distribution of forces shown in FIG. 2 by boosters 2, 3 fixed to the shell at points 8, 9, respectively.

According to the patent application previously cited, transmission of deformation to the satellite is prevented by installing between the satellite and the launch vehicle, for example at the level of the larger base 6b of the skirt 6, whose other base 6a receives the satellite, a suspension device consisting of an annular chamber with flexible walls and filled with a fluid. The "excess" forces received by the annular chamber in line with the attachment points 8, 9 are uniformly distributed circumferentially by the fluid in the chamber and the skirt 6 is therefore subjected to perfectly symmetrical forces that do not deform the skirt asymmetrically. The integrity of the satellite is therefore protected while the boosters 2, 3 are operating.

Means are provided for varying the pressure of the fluid contained in the annular chamber. Thus the pressure can be lowered from a relatively higher value ensuring good mechanical cohesion of the launch vehicle and the skirt 6, as is necessary in particular when the boosters 2, 3 are operating, to a relatively lower value for filtering forces such as vibration or shock forces propagating in the launch vehicle, in particular at the time of separation of stages of the launch vehicle and the nose-cap 7.

The device described in the patent application previously cited achieves the stated objective. However, it implies the use of either an annular chamber with flexible walls or a chamber with two complementary rigid annular walls mobile axially relative to each other, the chamber being sealed by at least one O-ring whose length is equal to the circumference of the chamber.

Because it is integrated into a launch vehicle, this kind of device must be very reliable. It can be very costly to achieve this because of the sealing problems that arise when using an annular chamber with flexible walls or an annular chamber incorporating an O-ring with the same circumference.

If the annular chamber with flexible walls solution is adopted, the flexible wall is greatly stiffened when the pressure in the chamber is high, to the point where forces transmitted by the device pass through the wall rather than through the fluid that it confines, which renders the device ineffective at high pressures.

SUMMARY OF THE INVENTION

One object of the present invention is precisely to provide a device for supporting a payload in a launch vehicle for launching said payload into space that is free of the above drawbacks and which in particular prevents the transmission of excess forces from the launch vehicle to the satellite, combined with highly reliable operation and moderate production cost.

The above objective of the invention, and others that will become apparent in the course of the following description, are achieved with a device for supporting a payload in a launch vehicle for launching said payload, said launch vehicle including a shell supporting at least one booster applying excess forces to said shell when in operation, and said device including means for mechanically connecting said payload to said shell of said launch vehicle, characterized in that said connecting means are designed to ensure mechanical coupling of the load and the shell in the direction of a longitudinal axis of the launch vehicle and decoupling thereof in radial and tangential directions.

As will be seen later, the connecting system prevents significant transmission of excess forces to the payload whilst ensuring mechanical cohesion of the launch vehicle/payload combination.

In one preferred embodiment of a device in accordance with the invention, the connecting means include an annular rim fastened to said payload and an annular groove fixed with respect to said shell, accommodating said rim so that is able to slide in any radial direction or tangential direction, and stopping any movement of said rim relative to said groove in the axial direction.

In accordance with another feature of the device in accordance with the invention, the connecting means further include at least one thrust bearing system mechanically connecting the shell and the payload in at least one of said radial and tangential directions. The thrust bearing system is at a node of the deformation of said shell in the presence of excess forces in cross section in a plane passing through said thrust bearing system. It is even more preferable for the thrust bearing to be disposed at a displacement node of said shell in a tangential direction and therefore in a tangential direction passing through that node.

BRIEF DESCRIPTION OF THE DRAWINGS

Other features and advantages of the present invention will become apparent on reading the following description and examining the accompanying drawings, in which;

FIG. 1 is a diagram showing part of a prior art satellite launch vehicle, as described in the preamble to this description, FIG. 2 is a graph representing the peripheral distribution of the axial forces applied to the shell of the launch vehicle when the boosters 8 and 9 are operating, and has been commented on in the preamble to this description, FIG. 3 shows a cross section of the shell of the launch vehicle when deformed by the forces applied to the shell by the boosters, and has been commented on in the preamble to this description, FIG. 4 is a diagrammatic plan view of the device according to the present invention, and FIGS. 5 and 6 are views of the device shown in FIG. 4 in section taken along the lines III and IV, respectively.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The device in accordance with the invention is located at the level of a plane P perpendicular to a longitudinal axis X of the launch vehicle (see FIG. 1), and that median plan can be at any level between the bases 6a and 6b of the skirt 6. It is advantageously at the level of the base 6b. Even more generally, the device could be installed at any level between the payload and the attachment points 8, 9 of the boosters 2, 3.

FIG. 4 shows that the device is generally circular, It Is essentially made up of axially superposed annular members between which are installed a plurality of spring thrust bearings $12_i$, a plurality of hydraulic thrust bearings $13_j$ and, in accordance with the present invention, a plurality of mechanical connection thrust bearings $14_i$.

The structure and the operation of the spring thrust bearings $12_i$ and the hydraulic thrust bearings $13_j$ constitute the subject matter of U.S. patent application, Ser. No. 09/868,641, with filing date of Sep. 25, 2001, which is based on the French patent application 98/16561, with filing date of Dec. 29, 1998. Reference may be had to the U.S. patent application for more details of the thrust bearings. Briefly, their function is to filter the shock referred to in the preamble of this description, by appropriately and temporarily reducing the axial stiffness of the launch vehicle, at the level of the plane P, which shock occurs in particular on jettisoning the nose-cap 7 and on separation of the stages of the launch vehicle.

Note that the thrust bearings mentioned above are regularly distributed and interleaved with each other. By way of illustrative and non-limiting example only, the device shown therefore comprises four spring thrust bearings $12_i$ (i from 1 to 4), four mechanical connecting thrust bearings $14_i$ (i 1 to 4), and eight hydraulic thrust bearings $13_j$ (j from 1 to 8) equi-angularly distributed with an increment of 22.5°.

At the level of the base 6b of the skirt 6 the shell 1a, 5a of the launch vehicle has substantially the same circular shape as the device shown in FIG. 2, which follows the contour of said shell. When the boosters 2 and 3 fixed to the shell at points 8 and 9, respectively, are operating, they apply to the shell 1a, 5a of the launch vehicle excess forces around the attachment points 8 and 9, as described above with reference to FIG. 2. These excess forces deform the shells 1a, 5a (see FIG. 3), including in the plane passing through the thrust bearings $12_i$, $13_j$ and $14_i$.

As confirmed by computation, mock-ups have shown that this deformation passes through four equi-angularly distributed points on the cross section of the shell of the launch vehicle. This distribution of the points is offset by an angle a from an axis passing through the attachment points 8, 9, as shown in FIG. 4.

This is explained by the composite material from which the shell of the launch vehicle is constructed. By way of illustrative and non-limiting example only, the angle α can be of the order of approximately 10°.

Clearly, deformation of the shell of the launch vehicle can damage the satellite if it propagates to the skirt 6 and then to the satellite 4.

An object of the present invention is precisely to prevent such propagation of deformation, in order to protect the physical integrity of the satellite.

In accordance with the invention, that object is achieved by decoupling the deformation of the skirt 6 and the deformation of the shell 5a of the second stage radially and tangentially, by providing at each of the four points mentioned above a mechanical connection thrust bearing 14, coupling the skirt 6 and the shell 5a of the second stage 5.

Turn now to FIGS. 5 and 6 of the accompanying drawings, which are partial views of the support device according to the invention in axial section taken along the lines III and IV, respectively, in FIG. 4, passing through a main section of the device and a respective one ($14_3$ of the thrust bearings $14_i$. It must be understood that the other thrust bearings of the same type are identical to that to be described.

By way of illustrative and non-limiting example only, the support device in accordance with the present invention is described as associated with and integrated into the suspension device described in the aforementioned U.S. patent application, Ser. No. 09/868,641. Of course, the two devices could be used independently of each other.

FIGS. 5 and 6 respectively show a first annular member 10 fixed to the skirt 6 by circumferentially distributed nut and bolt fasteners such as that referenced 15 and a second annular member 11 mounted on the second stage 5 of the launch vehicle by a connecting system (20a, 20b, 22, 23) forming part of the present invention.

The annular member 11 has a first annular flange 17 and a second annular flange 18 fastened by nut and bolt fasteners such as that referenced 19.

The first flange 17 takes the form of a ring whose axis is parallel to the axis X of the launch vehicle and which has two axially offset radial annular rims. One rim 17a projects outward and has nut and bolt fasteners such as that referenced 19 passed through it and the other rim 17b faces inward and engages in an annular groove delimited by rings 20a, 20b assembled by nut and bolt fasteners such as that referenced 21. The ring 20b is fixed to the second stage 5 by nut and bolt fasteners such as that referenced 16. The members $17_b$, $20_a$, $20_b$ are part of the connecting system of the device according to the present invention.

Shoes 22, 23 allow the rim 17b of the flange 17 to slide in the groove delimited by the rings 20a, 20b, in the direction transverse to the axis X of the launch vehicle, for a reason explained later.

The flange 17 can be clamped by the shoes 22, 23 to prevent the flange from being separated from the shoes by external forces applied to the flange.

The second flange 18 carries the spring and hydraulic thrust bearings mentioned above (not visible in FIGS. 5 and 6) and described more completely in the patent application previously cited, to which reference may be had for further details concerning them. The thrust bearings fasten the annular member 10 and the flanges 17 and 18, with the member 10 pressed against the flange 18.

For the purpose of describing the present invention, the member 10 and the flanges 17, 18 are considered to form an annular unitary assembly (10, 17, 18), i.e. an undeformable block, which is not the case when that assembly is used to filter shock, as described in the U.S. patent application previously cited.

Turn now to FIG. 6 of the accompanying drawings, which shows the device in accordance with the invention in section, including one ($14_3$) of the mechanical connection thrust bearings forming part of the connecting system of the support device according to the invention.

In a preferred embodiment of the present invention, the thrust bearing $14_3$ takes the form of a pin with a radial axis Y (see FIG. 6) passing through respective radial holes 24, 25 in the flange 17 and in a lug 26 projecting from the ring 20a and facing the flange 17.

Starting from one end, the pin $14_3$ includes a head 27, a screwthreaded part 28 adapted to be fixed in the hole 24, which is threaded accordingly, and a smooth-surfaced part 29 adapted to slide freely in the hole 25 in the lug 26.

It is therefore clear that the flange 17 is free to move in the radial direction Y toward or away from the lug 26.

Clearly, the same relative movements of the lug 26 and the flange 17 could be obtained by screwing the pin into the hole 25 and having the pin free to move in the hole 24.

The annular assembly (10, 17, 18) is therefore tree to be deformed radially at the level of the thrust bearings $14_i$ by the excess forces generated by the boosters 2, 3.

Because they hold the holes 24 and 25 in alignment on the axis Y, the pins $14_i$ prevent tangential movement (in a direction T perpendicular to the axes X and Y, see FIG. 4) of the flange 17 relative to the lug 26 and therefore of the skirt 6 and the satellite 4 attached to the assembly (10, 17, 18) relative to the shell 5 of the second stage and to the shell of the first stage, which is fastened to that of the second stage. To prevent it from being crushed by tangential forces, the hole 25 can be lined with a sleeve 30 made of an appropriate metal.

In accordance with the invention, by placing the pins $14_i$ at the nodes of tangential displacement of the shell of the launch vehicle when subject to excess forces, a mechanical connection is established between the satellite 4 and the launch vehicle which ensures the global cohesion of the resulting combination, without impeding radial and/or tangential deformation of the flange 17 relative to the ring 20a, which is necessary for decoupling these members from excess forces on the shell of the launch vehicle generated by the boosters. The tangential coupling established by the pins or thrust bearings $14_i$ has no effect on this decoupling because the thrust bearings are located at the nodes of tangential displacement, i.e. at points where no tangential forces are applied between the shell and the annular assembly (10, 17, 18).

Thanks to the invention, axial load errors at the interface between the shell 5a and the skirt 6 and due to the operation of the boosters 2, 3 can be very significantly reduced. In one particular embodiment of the device according to the invention, the magnitude of the load variations at this interface was reduced to less than 5 N/mm, i.e. to a level that caused no significant asymmetrical deformation of the skirt 6, which correctly protects the satellite carried by the skirt from transmission of such deformation.

This result is obtained thanks to the coupling system described above, which provides mechanical coupling of the launch vehicle and the satellite along the longitudinal axis X of the launch vehicle through cooperation of the annular rim 17b and the groove delimited by the rings 20a, 20b and decoupling of the launch vehicle and the satellite in the radial and tangential directions (except at the tangential displacement nodes). The decoupling prevents any significant transmission of excess forces to the satellite.

Of course, the invention is not limited to the embodiment described and shown, which is provided by way of example only. Thus the mechanical coupling by the thrust bearings of the ring 20a and the annular assembly (10, 17, 18) could be established at radial displacement nodes of the deformation of the shell of the launch vehicle, rather than at the tangential displacement nodes.

It is possible to compute the positions of the radial displacement nodes and the tangential displacement nodes and to verify the positions obtained on a mock up. The thrust bearings used to establish this coupling are very similar to the thrust bearings $14_i$ except that the axes of the pins are tangential rather than radial and therefore pass through aligned holes on a tangential axis like the axis T (see FIG. 4) in the corresponding lugs of the annular assembly (10, 17, 18) and the ring 20a, respectively.

Experiments and computation have shown that the mechanical cohesion of the launch vehicle/satellite obtained with "radial" thrust bearings disposed where the deformations of the shell in the radial direction are substantially zero is good, although slightly less good than with "tangential" thrust bearings.

Alternatively, said cohesion could be provided by a system of thrust bearings including both radial thrust bearings and tangential thrust bearings.

Similarly, the device according to the invention has been described as integrated into the suspension device with hydraulic and spring thrust bearings described in the U.S. patent application previously cited. Clearly, the support device according to the invention could be physically separated from any such suspension device, or even used in isolation if there is no need to treat the shock that the suspension device is intended to filter.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for supporting a payload in a launch vehicle for launching said payload, said launch vehicle including a shell supporting at least one booster applying excess forces to said shell when in operation, said device comprising an annular assembly for mechanically connecting said payload to said shell of said launch vehicle, said annular assembly designed to ensure mechanical coupling of the payload and the shell in a direction of a longitudinal axis of the launch vehicle and decoupling thereof in radial and tangential directions relative to said longitudinal axis.

2. The device according to claim 1, wherein said annular assembly includes an annular rim fastened to said payload and an annular groove fixed with respect to said shell, said groove accommodating said rim so that said rim is able to slide in a radial direction or a tangential direction, and stopping any movement of said rim relative to said groove in the direction of the longitudinal axis of the launch vehicle.

3. The device according to claim 1, wherein said annular assembly further includes at least one thrust bearing mechanically connecting the shell and the payload in at least one of said radial and tangential directions.

4. The device according to claim 3, wherein said mechanically connecting thrust bearing is disposed at a tangential displacement node of said shell so as to oppose tangential movement of the shell relative to the payload.

5. The device according to claim 3, wherein said mechanically connecting thrust bearing is disposed at a radial displacement node of said shell so as to oppose radial movement of the shell relative to the payload.

6. The device according to claim 3, wherein said thrust bearing includes a cylindrical pin passing through aligned respective holes in a part fastened to the shell and a part fastened to the payload.

7. The device according to claim 6, wherein said pin is adapted to slide in at least one of said holes.

8. The device according to claim 7, wherein said pin is fixed to one of said parts.

9. The device according to claim 3, further including a plurality of thrust bearings each disposed at a node of movement of the shell when subjected to forces sufficient to deform said shell.

10. The device according to claim 1, further including at least one mechanically connecting thrust bearing located at a node of tangential displacement and adapted to oppose relative movement between said shell and said payload in a tangential direction and at least one other mechanically connecting thrust bearing located at a node of radial displacement and adapted to oppose relative movement between said shell and said payload in a radial direction.

11. The device according to claim 1, wherein said annular assembly includes:

an annular flange fixedly connected to said payload, said flange having a rim extending radially inward substantially perpendicular to the longitudinal axis of the launch vehicle; and a pair of rings fixed with respect to said shell and forming an annular groove therebetween, said groove accommodating said rim so that said rim is able to slide in a radial direction and a tangential direction, said rings preventing any movement of said rim relative to said groove in the direction of the longitudinal axis of the launch vehicle.

12. The device according to claim 11, further including at least one mechanically connecting thrust bearing adapted to oppose tangential movement of said rim within said groove.

13. The device according to claim 11, further including at at least one mechanically connecting thrust bearing adapted to oppose radial movement of said rim within said groove.

14. The device according to claim 11, wherein a first one of said rings includes an upwardly projecting lug with a hole therein, said annular flange including a cylindrical opening in alignment with said hole, and further comprising a pin passing through said hole and said cylindrical opening to prevent tangential movement of said rim within said groove.

15. The device according to claim 14, wherein an interior surface of one of said holes is smooth, allowing said pin to slide therein, while an interior surface of the other hole is threaded.

16. A device for supporting a payload in a launch vehicle for launching said payload with said launch vehicle including a shell supporting at least one booster applying excess forces to said shell when in operation, said device comprising an annular assembly mechanically connecting said payload to said launch vehicle shell and including a rim fixedly connected to said payload and slidingly fitted in a groove formed within said shell, said groove preventing movement of said rim in a direction corresponding with a longitudinal axis of said launch vehicle while allowing said rim to move radially and tangentially relative to said longitudinal axis.

17. The device according to claim 16, further including at least a first mechanically connecting thrust bearing adapted to oppose relative movement between said rim and said shell in a tangential direction.

18. The device according to claim 17, further including at least a second mechanically connecting thrust bearing adapted to oppose relative movement between said rim and said shell in a radial direction.

19. The device according to claim 18, wherein said first thrust bearing is disposed at a node of tangential displacement, and said second thrust bearing is disposed at a node of radial displacement.

20. The device according to claim 17, wherein said first thrust bearing includes a cylindrical pin passing through aligned respective holes in a part fastened to said rim and a part fastened to said shell.

21. The device according to claim 20, wherein an interior surface of one of said holes is smooth, allowing said pin to slide therein, while an interior surface of the other hole is threaded.

* * * * *